United States Patent
Rafferty et al.

(10) Patent No.: US 7,643,755 B2
(45) Date of Patent: Jan. 5, 2010

(54) OPTICAL RECEIVER COMPRISING A RECEIVER PHOTODETECTOR INTEGRATED WITH AN IMAGING ARRAY

(75) Inventors: Conor S. Rafferty, New York, NY (US); Clifford Alan King, New York, NY (US)

(73) Assignee: Noble Peak Vision Corp., Wakefield, MA (US)

( * ) Notice: Subject to any disclaimer, the term of this patent is extended or adjusted under 35 U.S.C. 154(b) by 544 days.

(21) Appl. No.: 10/964,266

(22) Filed: Oct. 13, 2004

(65) Prior Publication Data

US 2005/0191062 A1    Sep. 1, 2005

Related U.S. Application Data

(60) Provisional application No. 60/510,933, filed on Oct. 13, 2003.

(51) Int. Cl.
*H04B 10/00* (2006.01)
*H04B 10/06* (2006.01)

(52) U.S. Cl. .................. 398/131; 398/202; 398/118; 398/122; 398/123; 398/124; 398/125; 398/129; 398/130

(58) Field of Classification Search ......... 398/118–131, 398/202; 385/49; 250/208, 332, 370; 257/431
See application file for complete search history.

(56) References Cited

U.S. PATENT DOCUMENTS

| | | | |
|---|---|---|---|
| 4,823,402 A | | 4/1989 | Brooks |
| 4,939,369 A | * | 7/1990 | Elabd ......................... 250/332 |
| 5,030,004 A | * | 7/1991 | Grant et al. .................. 398/131 |
| 5,401,952 A | * | 3/1995 | Sugawa .................... 250/208.1 |
| 5,447,117 A | | 9/1995 | Yonehara et al. |
| 5,467,204 A | | 11/1995 | Hatano et al. |
| 5,770,850 A | | 6/1998 | Bowen et al. |
| 5,790,291 A | | 8/1998 | Britz |
| 5,953,146 A | * | 9/1999 | Shelby ........................ 398/131 |
| 6,122,084 A | * | 9/2000 | Britz et al. .................. 398/131 |
| 6,493,490 B1 | | 12/2002 | Steiger |

(Continued)

FOREIGN PATENT DOCUMENTS

JP    5-183515    7/1993

(Continued)

OTHER PUBLICATIONS

Colace et al: "Efficient high-speed near-infrared Ge photodetectors integrated on Si Substrates", Applied Physics Letter, vol. 76, No. 10, Mar. 6, 2000, pp. 1231-1233.*

(Continued)

*Primary Examiner*—Ken N Vanderpuye
*Assistant Examiner*—Li Liu
(74) *Attorney, Agent, or Firm*—Wolf, Greenfield & Sacks, P.C.

(57) ABSTRACT

A high-speed optical communications cell is integrated at the interior of a two-dimensional imaging array. The combined receiver and imager carries out both photodetection (converting photons to electrons) and circuit functions (e.g. amplifying and integrating the signals from the photodetectors). The high-speed receiver cell comprises a photodetector and a high-speed amplification circuit, providing an electrical output which can follow a rapidly varying optical signal falling on the photodetector. The imaging array comprises an array of photodetectors and readout circuits, providing an electrical representation of the variation of light with position across the receiver surface. The presence of an imaging array surrounding the communications receiver, and in the same plane as it, allows a single optical path to be used for source acquisition and tracking as well as for data reception.

19 Claims, 4 Drawing Sheets

U.S. PATENT DOCUMENTS

| | | | |
|---|---|---|---|
| 6,509,992 B1 | 1/2003 | Goodwill | |
| 6,522,440 B1 | 2/2003 | Poon et al. | |
| 6,577,421 B1 | 6/2003 | Cheng et al. | |
| 6,731,415 B1 | 5/2004 | Plett | |
| 6,768,876 B1 | 7/2004 | Steiger et al. | |
| 6,775,480 B1 | 8/2004 | Goodwill | |
| 7,292,788 B2 * | 11/2007 | Triebes et al. | 398/122 |
| 7,389,052 B2 * | 6/2008 | Oettinger et al. | 398/129 |
| 2002/0039833 A1 | 4/2002 | Bensahel et al. | |
| 2002/0131121 A1 * | 9/2002 | Jeganathan et al. | 359/152 |
| 2002/0196506 A1 * | 12/2002 | Graves et al. | 359/172 |
| 2003/0013218 A1 | 1/2003 | Chason | |
| 2003/0034501 A1 * | 2/2003 | Higgins, Jr. | 257/140 |
| 2003/0067657 A1 * | 4/2003 | Dimmler et al. | 359/159 |
| 2003/0213915 A1 * | 11/2003 | Chao et al. | 250/370.14 |
| 2004/0052465 A1 * | 3/2004 | Verbana et al. | 385/49 |
| 2004/0121507 A1 | 6/2004 | Bude et al. | |
| 2004/0156640 A1 | 8/2004 | Dress et al. | |
| 2004/0258415 A1 * | 12/2004 | Boone et al. | 398/125 |
| 2005/0104089 A1 | 5/2005 | Engelmann et al. | |
| 2005/0191062 A1 | 9/2005 | Rafferty et al. | |

FOREIGN PATENT DOCUMENTS

WO    WO 2004/008537 A2    1/2004

OTHER PUBLICATIONS

Search Report and Written Opinion from PCT International Application No. PCT/US06/31591 mailed Nov. 2, 2007.

* cited by examiner

OPTICAL RECEIVER COMPRISING A RECEIVER PHOTODETECTOR INTEGRATED WITH AN IMAGING ARRAY

CROSS REFERENCES TO RELATED APPLICATIONS

This application claims the benefit of U.S. Provisional Application Ser. No. 60/510,933 filed by Conor S. Rafferty and Clifford A. King on Oct. 13, 2003 and entitled "Communications Photodetector Integrated With Imaging Array", which application is incorporated herein by reference.

FIELD OF THE INVENTION

This invention relates to line-of-sight optical communication systems and, in particular, to a receiver integrated with an imaging array for such optical communication and related systems.

BACKGROUND OF THE INVENTION

Line-of-sight optical communication systems (LSOCs) are becoming increasingly important in a wide variety of applications. A typical LSOC comprises a laser transmitter for transmitting a modulated narrow beam of light through space or the Earth's atmosphere to a photodetector receiver. In space, line-of-sight optical communication to and from satellites is generally faster than radio communication and uses lighter equipment. On Earth, line-of-sight optical communication is free of spectrum regulation and is less susceptible to eavesdropping than radio. Moreover, the laser beam transmitters can be modulated at extremely high rates.

One difficulty that has delayed the full potential of LSOC systems is the necessity that the receiver and transmitter be very accurately pointed at one another to establish the desired link. Moreover, even after the link is established, the accuracy of pointing must be monitored and maintained over time. The system must adjust to the movement of satellites, the rotation of the Earth, and the vibration and sway of the transmitting and receiving stations. Any loss of pointing accuracy leads to a reduction or loss of signal that can substantially impair communication.

While there have been a variety of approaches to achieving the desired accuracy, none have proven completely satisfactory. One approach in terrestrial applications is to affix a spotting telescope to a data receiving telescope. The spotting scope allows a human operator to visually direct the receiver toward the transmitter. This approach, however, adds extra hardware to the system and requires human intervention. Moreover it requires precise alignment of the spotting scope with the axis of the data scope.

In space applications, added optical beacons can be used to direct added track sensors on the receiving satellite. The added beacons and sensors, however, increase the weight of the equipment and impose additional power demands on the satellite.

An alternative approach uses an imaging array, such as a CCD camera, to capture some of the light from the receiving telescope. The array feeds a signal to a computer which, in turn, analyzes the image and directs the telescope to the transmitter. This approach, however, requires that a beam splitter be placed in the main optical path, reducing the power available for data reception. It also introduces a second optical path that requires precise alignment of the beam splitter, the optical path to the detector and the optical path to the images.

Nor has the prior art found a completely satisfactory solution to the problem of maintaining pointing accuracy after lock-on. In the usual approach, a beam splitter is placed in the optical path and a fraction of the beam is diverted to a detector, such as a quadrant detector or imaging array, that is sensitive to the location of a laser spot on its surface. U.S. Pat. No. 5,770,850 granted to Bowen et al in 1998 and U.S. Pat. No. 6,522,440 granted to Poon et al in 2003 exemplify such systems. The beam splitter, however, consumes power and also introduces an additional optical path which must be precisely aligned. Furthermore, the position detector must be precisely located so that when the incoming data beam is perfectly centered on the data receiving photodetector, the split-off beam lies at the precise center of the position detector.

To avoid the latter difficulties in transmitter tracking, it has been suggested that the quadrant detector have a hole or window at its center, so that the majority of the incoming beam may pass through the hole or transmission window to a data detector located behind the detector. See U.S. Pat. No. 6,493,490 granted to Steiger in 2002 and U.S. Pat. No. 5,790,291 granted to Britz in 1998. This proposal, however, requires assembling the data photodetector with the quadrant detector and positioning the data detector accurately at the center of the hole or window. It also requires a separate solution to the problem of transmitter recognition and acquisition.

Accordingly there is a need for improved LSOC systems including a compact receiver that can be readily and continuously aligned with the transmitter.

SUMMARY OF THE INVENTION

In accordance with the invention, an optical communication system is provided with an optical receiver cell integrated at the center of a two-dimensional imaging array (imager). The combined receiver and imager carries out both photodetection (converting photons to electrons), and circuit functions (e.g. amplifying and integrating the signals from the photodetectors). The receiver cell advantageously comprises a high speed photodetector and a high-speed amplification circuit, that provides an electrical output which can follow a rapidly varying (modulated) optical input signal. The integrated imaging array advantageously comprises an array of Ge photodetectors and silicon readout circuits that can provide an electrical representation of the variation of light with position across the receiver surface. The presence of a coplanar imaging array surrounding the receiver cell allows the use of a single optical path both for data reception and for source acquisition and tracking.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and are not to scale.

DETAILED DESCRIPTION

One aspect of the present invention is an integrated receiver and imager for a line-of-sight optical communication systems (LSOC). The integrated receiver and imager is intended to be used in a LSOC at the heart of the receiving system.

Figure 1:
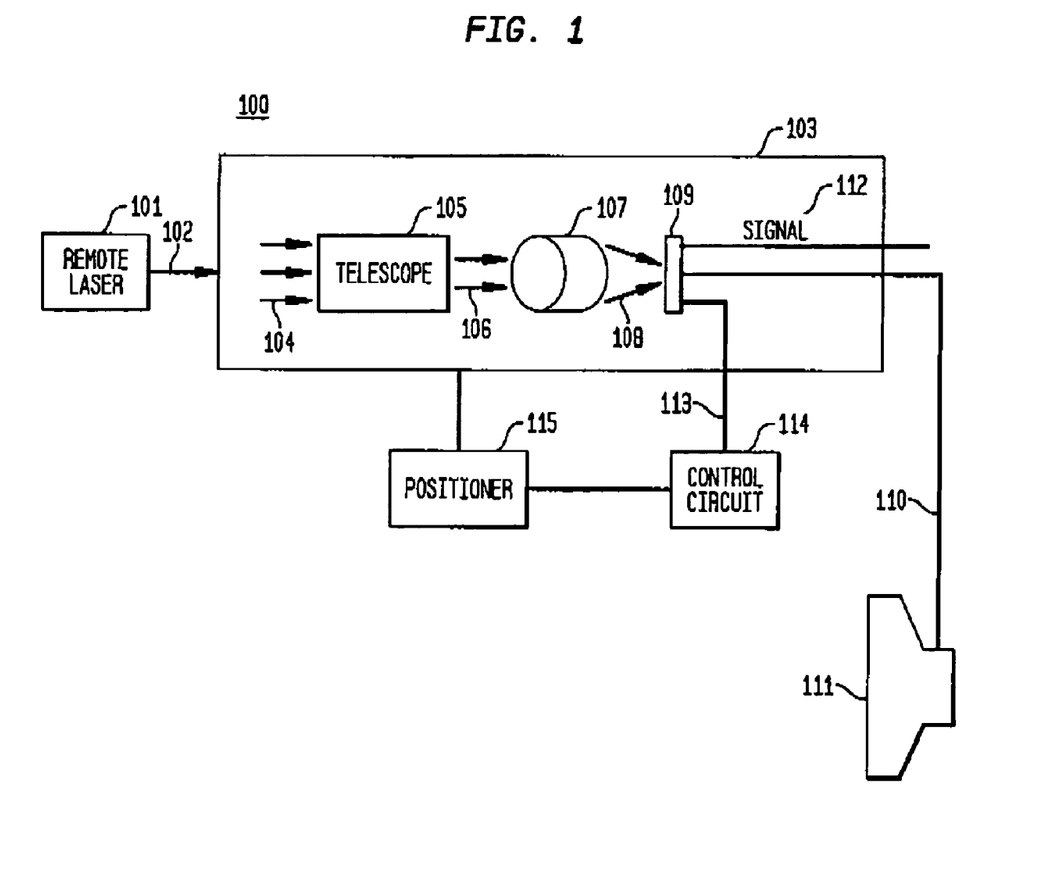
FIG. 1 is a block diagram of a line-of-sight optical communication system.

Referring to the drawings, FIG. 1 schematically illustrates a LSOC 100 using an integrated receiver and imager in accordance with the invention. The system comprises a remote optical transmitter 101, such as a modulated laser, that can shine a beam of light 102 through atmosphere or space onto an optical receiver 103. At the receiver, the transmitted beam 104 will be collected by collection optics (e.g. telescope 105) and concentrated to a smaller beam 106 that falls on a variable focal length lens 107. The variable lens 107 can either pass the beam with spot size unchanged (collimated beam), or it can focus the beam (converging beam 108). Whether collimated or converging, the beam falls on the integrated receiver and imager 109. When the variable lens passes collimated light, the imager 109 generates an electrical representation 110 of the image seen by the telescope. The electrical representation 110 can be displayed on a screen 111 which an operator can use to point the telescope more perfectly towards the transmitter. When the variable lens 107 is focused so that the input beam converges to a small area in the center of the image, the modulation of the incoming beam is detected by a data receiver cell of 109 and converted to an electrical signal 112 which carries the communication information. A tracking signal 113 is derived from the imager pixels nearest the receipt cell and sent to tracking control circuit 114. The tracking control circuit 114 directs an automatic positioning mechanism 115 to maintain accurate pointing at the remote transmitter 101 during signal reception.

In the case of an unmanned satellite receiver, the display and the operator would be replaced by a programmed computer (not shown) to recognize the image captured by the telescope. The computer would provide additional control to the positioner 115 above and beyond that provided by the tracking control circuit 114.

Figure 2:
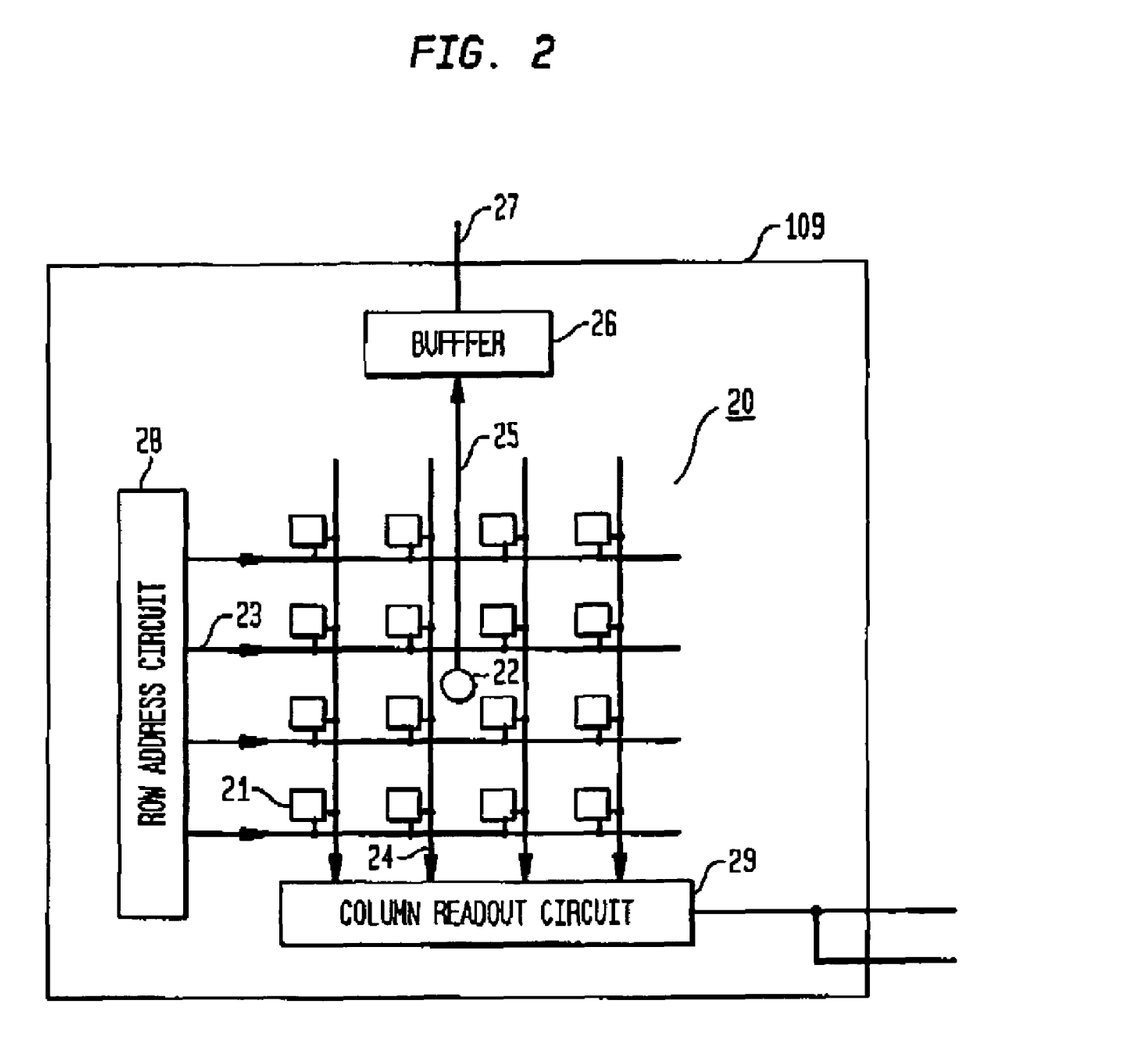
FIG. 2 is a block diagram of an optical receiver including an integral imager.

FIG. 2 illustrates a preferred embodiment of the integrated receiver and imager 109 comprising a two-dimensional array 20 of imaging cells 21 surrounding laterally interior high-speed receiver cell 22. Although a multiplicity of imaging cells 21 is desirable to form a good image, a smaller 4×4 array is shown for clarity.

Each imaging cell 21 comprises a photodetector and integrating circuit (not individually shown). The integrating circuit at each cell accumulates electrical energy over a period of time so that a low optical signal to the photodetector generates sufficient electrical signal to be measurable above noise. The integration period is adjusted so that under even weak illumination sufficient charge is generated to overcome electrical noise. The electrical signal in each imaging cell 21 is periodically queried as by a row address circuit 28 using row select lines 23 and a column readout circuit 29 using column readout lines 24. The imaging cells 21 are reset after readout.

The high-speed receiver cell 22 comprises a fast photodetector and a high-speed amplifier (not shown in FIG. 2). When light falling on the receiver cell 22 is sufficiently strong, the cell 22 will be able to detect rapid fluctuations (modulations) in incident optical power. The amplifier in the receiver cell continuously monitors the output of the fast photodetector and turns the weak fluctuations into a signal sufficiently strong to drive the output line 25. Further amplification and filtering can be carried out by the output buffer 26 before the signal leaves the chip to become the communication signal 27.

Although the data receiver cell has been described as a single cell, it should be understood that a plurality of centrally-located receiver cells can be used. For instance, a number of cells, each sensitive to different features of the incoming light such as wavelength or polarization, can be used.

While the photodetectors used in the imaging cells and the high speed data receiver cell may be the same or may have a different size, shape, or construction, the circuits attached to the photodetectors in the imaging pixel cells are different from the circuits attached to the photodetector in the high-speed data receiver cell. Therefore the imaging cells and the data receiver cell are typically different in the following ways.

Each imaging cell integrates the electrical output of its photodetector over a relatively long time period.

The receiver cell continuously monitors the output of its photodetector and continuously presents an amplified version to the output buffers.

Figure 3A:
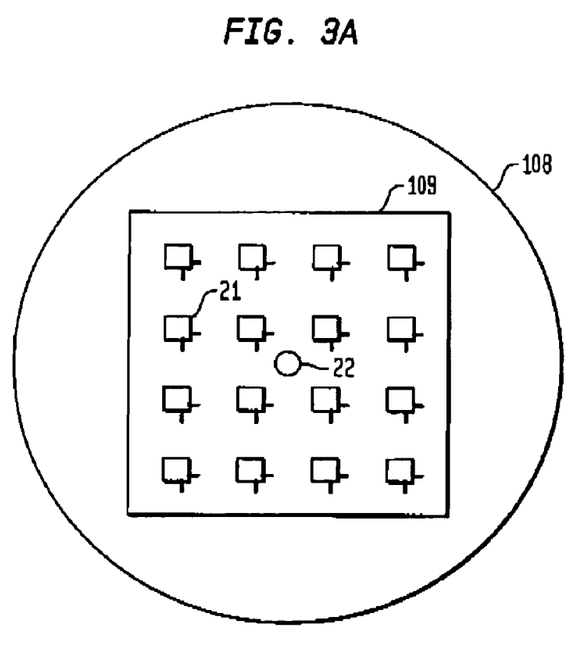
FIG. 3a shows a received optical spot that covers the imager when forming an image.

The imaging cells are sensitive to the distribution of light in space across their surfaces, but respond only to very slow variations with time The receiver cell is sensitive to a rapid time variation of the incoming light FIG. 3a shows how the optical beam 108 will advantageously cover the entire imager array of 109 when the variable focal length lens (107 of FIG. 1) passes the telescope image unchanged. When beam 108 is distributed over the entire imager array, the optical power on each imaging cell 21 is relatively small. In a typical embodiment, the array might comprise 1024×1024 or over a million imaging cells (pixels). If the incoming light signal is distributed over the entire surface of the array (as is necessary to create an image) each pixel will receive less than one millionth of the total power available. Therefore the integration circuit at each imaging pixel is essential to collect sufficient light to generate a measurable electrical signal.

Figure 3B:
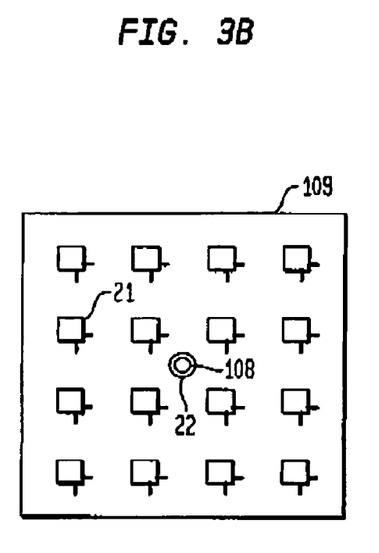
FIG. 3b illustrates a received optical spot that is focused on the data receiver.

FIG. 3b shows how the optical beam 108 can be focused to direct all its power onto the single high-speed photoreceiver 22. In this situation, the phototreceiver receives the total power collected by the telescope. The telescope power will be comprised of an image of the transmitter, the modulated output of the transmitter, and stray or background light such as reflected sunlight. The total variation in power may be rather small. However the high total power makes the variations detectable.

Integrated photodetectors cannot be perfectly isolated. Therefore a small amount of optical and electrical cross-talk will occur between the data receiver cell 22 and the imaging cells 21 that are nearby, even when all the power is focused on the receiver cell 22. As a result, power will also be measured in the imaging pixels 21 that are nearest the central receiver pixel 22. By monitoring the power in these nearby pixels, any deviation of the beam from the center of the array is detected. An imbalance of power falling in one or other of the pixels will result in a stronger electrical signal in those pixels nearest where the beam has strayed. The tracking signal (113 of FIG. 1) can be derived from those pixels without additional circuitry beyond the standard readout circuits used to form an image.

Figure 3C:
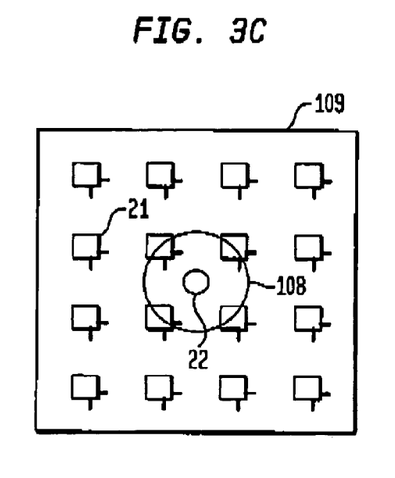
FIG. 3c shows a received optical spot of intermediate focus.

If the photodetectors are of such construction that the cross talk is too weak to be easily detected, then the focus of the beam 108 can be relaxed as shown in FIG. 3c. The power will continue to fall substantially on the center receiver cell 22 but a small amount of light falls on neighboring imaging cells. The power falling on those neighboring cells can serve as a tracking signal if any imbalance is detected.

Figure 4:
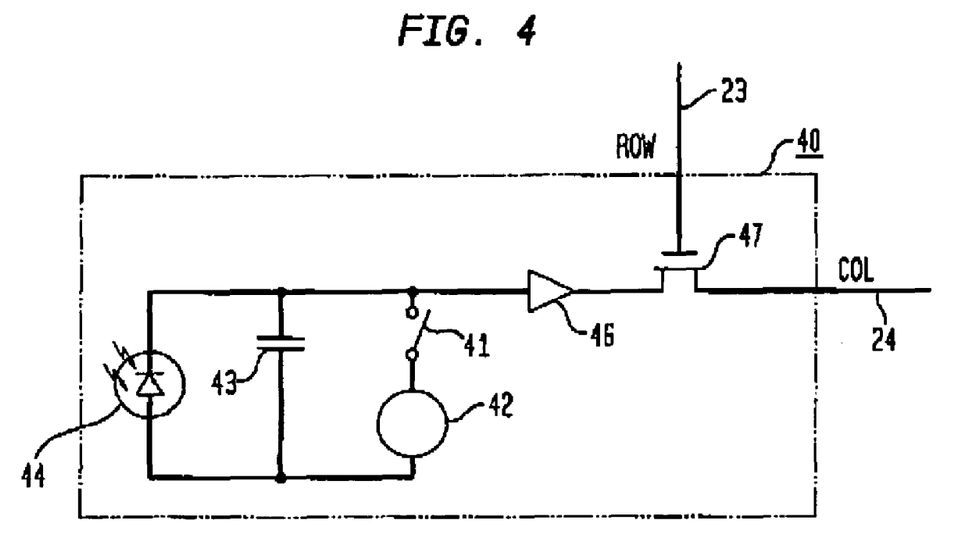
FIG. 4 illustrates an integrating circuit used in measuring low power levels in an imaging cell.

FIG. 4 shows an exemplary integrating circuit 40 which can be located in each imaging cell (21 of FIG. 2). A reset switch 41 is first briefly connected, setting a reference voltage 42 across an integration capacitance 43. Light falling on the photodiode 44 generates a current which causes a floating node 45 to slowly discharge. The accumulated change in the voltage on the floating node 45 is proportional to how much light has fallen since the cell was last reset and inversely proportional to the size of the capacitance 43. The total capacitance 43 comprises the capacitance of the photodiode 44, the input capacitance of the amplifier 46, and various stray capacitances. The floating node 45 is connected to the input of the amplifier 46. At the end of the integration period, the row select line 23 is briefly connected, turning on row select transistor 47, and the amplifier drives the column readout line 24. Thus the column bus is driven to a value which is related to the total amount of light that has fallen during the integration period. After the signal has been sampled, the cell is reset and the next integration period begins.

Figure 5:
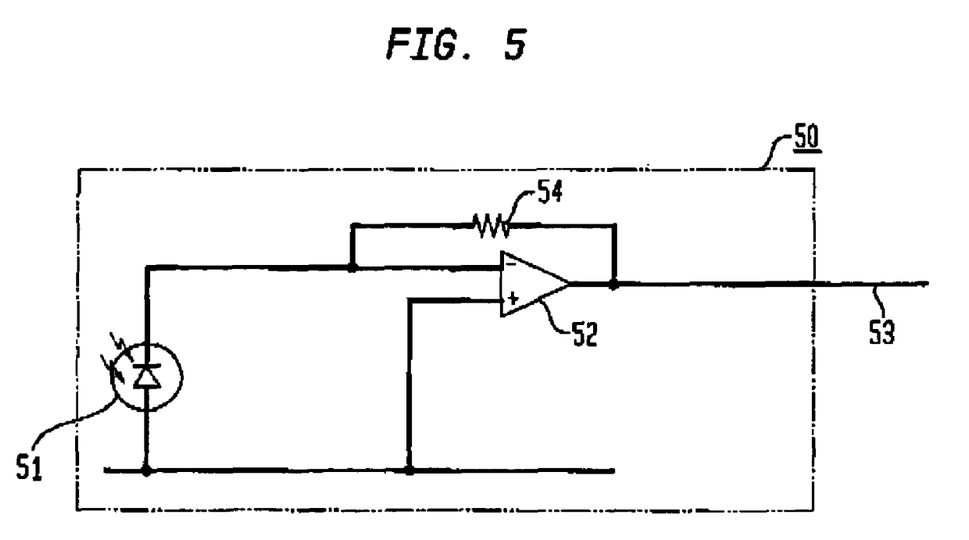
FIG. 5 shows a low-noise amplifier used in a data reception cell for high-speed amplification.

FIG. 5 is an exemplary high speed amplifier circuit 50 which can be located in the receiver cell (22 of FIG. 2). The photodetector 51 generates a small rapidly-varying current in proportion to the amount of light falling on it. An amplifier 52 transmits an amplified replica of its input to the data output line 53. A feedback resistance 54 presents the photodetector with a virtual input impedance equal to its physical resistance divided by the gain of the amplifier. The much reduced input impedance reduces the readout noise and allows high-speed low-noise data reception.

Although the invention has been shown and described with respect to the exemplary circuits, it should be understood by those skilled in the art that many other circuits with a similar purpose and effect can be substituted to achieve the same ends.

The receiver cell is advantageously at the center of the imaging array, but the receiver cell can be placed any location on the array where the receiver cell is surrounded by imaging cells.

Although a variable focal length lens is advantageous, other optical systems might be used to provide intensified power to the receiver cell. For instance a system can use a very small lens which collects light only from a fraction of the image and focuses it on the receiver cell.

A preferred embodiment of the invention uses germanium photodetectors integrated on a silicon chip. An alternative embodiment could use an integrated germanium photodetector as the receiving photodetector, and silicon photodetectors as the imaging photodetectors. Both types of photodetectors could be integrated with silicon electronics on the same silicon chip. A preferred method of integrating coplanar photodetectors on a silicon substrate is described in U.S. patent application Ser. No. 10/453,037 which is incorporated herein by reference. In either of the preceding embodiments, a pure germanium layer could be replaced by a silicon/germanium alloy.

An alternative embodiment of the invention uses a compound semiconductor layer such as InGaAs or HgCdTe to form the photodetector array, with the layer being bonded to a silicon readout integrated circuit (ROIC). The ROIC would provide the integration function at each imaging cell as well as providing the high speed amplifier for the receiver cell. The hybrid array comprised of a bonded photodetector layer and a circuit layer would form an integrated receiver and imaging array.

Another embodiment of the invention uses a compound photodetector for the receiving cell bonded to a silicon imaging array. The high density imaging circuitry is located in the silicon chip. The fast receiver circuitry is located either in silicon or in the compound semiconductor chip.

Yet another embodiment of the invention could use a single compound semiconductor array to provide both the optical detection as well as the circuit functions required by the integrated receiver/imager array.

Another embodiment of the invention could use silicon photodetectors fabricated in the same substrate as the silicon circuits. Such an imaging array would be more sensitive to visible and near-infrared light than to currently standard communications wavelengths.

Still another embodiment of the invention could use an amorphous silicon photodetector cell integrated above the silicon circuits.

Thus a LSOC or related system includes a high-speed optical communications cell integrated within the interior of a two-dimensional imaging array. Advantageously the high speed cell and the imaging array cells are coplanar to within a few wavelengths of the light received (advantageously within about 5 wavelengths and preferably within about 3 wavelengths). The cells will be coplanar to within less than about 10 micrometers in typical applications. The combined receiver and imager carries out both photodetection and the circuit functions of amplifying and integrating the signals from the photodetectors. The high-speed receiver cell comprises a photodetector and a high-speed amplification circuit, providing an electrical output which follows a rapidly varying optical signal falling on it. The imaging array comprises an array of imaging photodetectors and readout circuits that provide an electrical representation of the variation of light with position across its surface.

It can now be seen that one aspect of the invention includes an optical receiver for receiving a modulated optical signal beam from a signal source comprising a substrate and, integrated with the substrate (as part of the substrate material or by epitaxial growth), a) at least one optical receiver cell for receiving the signal beam and converting the optical signal to an electrical signal, and b) a plurality of imaging cells to image the signal source for use in aligning the receiver with the source. The optical receiver cell preferably comprises a high speed photodetector (10 megahertz or faster) and a high speed amplification circuit to follow the modulated variation of the optical signal beam.

In advantageous embodiments, the substrate comprises silicon and the imaging cells comprise an array of photodetectors comprising germanium. Silicon readout circuits (preferably integrated on the substrate) provide an electrical representation of the variation of light with position across the surface of the receiver. The plurality of imaging cells are advantageously disposed about the receiver cell (or cells) in a co-planar imaging array. Preferably the imaging cells and the receiver cell(s) receive light from the signal beam in a single optical path.

Each imaging cell can comprise a photodetector and an integrating circuit to accumulate electrical energy from illumination over a period of time. The imaging cells typically have response speeds of less than 500 kilohertz and preferably 30 hertz or less. The electrical outputs from the imaging cells can be used to generate a tracking signal for directing (via a tracking control circuit) a positioning mechanism to maintain accurate pointing of the receiver toward the source of the signal beam.

Another aspect of the invention is a line of sight optical communication system comprising an optical transmitter for transmitting a beam of modulated light through the atmosphere or through space and an optical receiver system including a) collection optics for collecting and concentrating the beam, b) a variable focal length lens for collimating or converging the beam and c) an optical receiver as described above. In operation, the collimated beam can be distributed over substantially all the imaging cells and the converged beam can be concentrated essentially on the receiver cell. The power in imaging cells adjacent the receiver cell can be monitored to detect deviation of the optical beam from the receiver cell.

Another aspect of the invention is an optical imaging array comprising a substrate of a first photosensitive crystalline semiconductor material and, integrated on the substrate, a plurality of photodetectors comprising photosensitive crystalline semiconductor material. The photosensitive material of at least one of the photodetectors is the first photosensitive material of the substrate. The photosensitive material of at least another of the photodetectors is a second photosensitive semiconductor chemically different from the first material. The first photosensitive material can be silicon and the second photosensitive material can be selected from among germanium, germanium alloy, InGaAs and HgCdTe. The first photosensitive material can be silicon and the second material can comprise germanium epitaxially grown on the silicon.

In yet another aspect, the invention is an optical imaging device comprising a substrate and, integrated on the substrate, a plurality of photodetectors wherein at least one of the photodetectors is a high speed photodetector (with a response speed of at least 10 megahertz and preferably at least 1 gigahertz) and at least one of the photodetectors is a low speed photodetector with a response speed of less than 500 kilohertz (preferably 30 hertz or less). The photodetectors are preferably disposed in a substantially planar array with a plurality of low speed photodetectors disposed peripherally around at least one high speed photodetector. Advantageously the photodetectors are co-planar to within 10 micrometers or less.

The advantages of the present invention are many fold. They include, in various embodiments, provision of:

A high-speed data photodetector in the same plane as a tracking detector
A high-speed data photodetector in the same plane as an acquisition imager
A high-speed data photodetector fabricated at the center of a tracking detector and not needing to be aligned with a separate tracking detector
No assembly of a data photodetector and tracking photodetector is necessary
A separate means to track beam deviation is not necessary
A separate means to acquire an image of the transmission source is not necessary
Power-wasting and alignment-tricky beam-splitters are not necessary
Only a single optical path is used by the receiver
No precision alignment of multiple optical paths is necessary
A much reduced component count leads to a simpler, lighter, more reliable and cheaper system While the above description contains many specific examples, these examples should not be construed as limitations on the scope of the invention. They are examples of advantageous embodiments of the invention. Accordingly, the scope of the invention should be determined not by the embodiments illustrated, but by the appended claims.

What is claimed is:

1. An apparatus comprising:
    a substrate comprising a first photosensitive crystalline semiconductor material; and
    a plurality of photodetectors integrated on the substrate, the plurality of photodetectors comprising:
        at least one first photodetector comprising the first photosensitive crystalline semiconductor material; and
        at least one second photodetector comprising a second photosensitive crystalline semiconductor material chemically different from the first photosensitive crystalline semiconductor material,
    wherein the at least one second photodetector is configured as at least part of an optical receiver cell, integrated on the substrate, to receive an optical signal beam from a signal source and to convert the optical signal beam to an electrical signal; and
    wherein a subset of the plurality of photodetectors is configured as an optical imaging array,
    wherein the optical imaging array comprises a plurality of imaging cells to image the signal source for aligning the optical receiver cell with the signal source, wherein the plurality of imaging cells comprises at least 100 imaging cells, and wherein at least one imaging cell of the plurality of imaging cells comprises the at least one first photodetector.

2. The apparatus of claim 1 wherein the optical receiver cell is a high speed cell configured to follow a variation of the optical signal beam.

3. The apparatus of claim 2,
    wherein the optical receiver cell is a high speed cell with a response speed of at least 10 megahertz; and
    wherein at least sixteen imaging cells of the plurality of imagine cells have a response speed of less than 500 kilohertz.

4. The apparatus of claim 3 wherein the optical receiver cell has a response speed of one gigahertz or more and each of the at least sixteen imaging cells of the plurality of imaging cells has a response speed of 30 hertz or less.

5. The apparatus of claim 3 wherein each imaging cell of the plurality of imaging cells comprises a respective photodetector, and the respective photodetectors of the plurality of imaging cells are coplanar to within 10 micrometers or less.

6. The apparatus of claim 1 wherein the optical receiver cell is a high speed cell that further comprises a high speed amplifier coupled to the at least one second photodetector.

7. The apparatus of claim 1 wherein the substrate comprises silicon, and the plurality of imaging cells comprise silicon readout circuits to provide an electrical representation of a variation of light with position across a surface of the optical imaging array.

8. The apparatus of claim 1 wherein the plurality of imaging cells are disposed about the optical receiver cell and are substantially co-planar with the optical receiver cell.

9. The apparatus of claim 1 wherein the optical receiver cell and the plurality of imaging cells receive light from the signal source in a single optical path.

10. The apparatus of claim 1 further comprising a positioning mechanism and a tacking control circuit, the tracking control circuit responsive to at least one electrical output from the plurality of imaging cells to generate a tracking signal for directing the positioning mechanism to maintain accurate pointing of the optical receiver cell toward the signal source.

11. The apparatus of claim 1 wherein each imaging cell of the plurality of imaging cells comprises an integrating circuit to accumulate electrical energy from illumination over a period of time.

12. A line of sight optical communication system comprising:
   the signal source for transmitting the optical signal beam through atmosphere or space, and
   an optical receiver system for receiving the transmitted beam, the optical receiver system comprising collection optics for collecting and concentrating the transmitted beam to form a concentrated beam, a variable focal length lens for collimating the concentrated beam to form a collimated beam or converging the concentrated beam to form a converged beam, and an apparatus according to claim 1.

13. The communication system of claim 12 wherein the collimated beam is distributed over substantially all of the imaging cells of the plurality of imaging cells and the converged beam is concentrated essentially on the optical receiver cell.

14. The communication system of claim 12 wherein an amount of power incident on imaging cells of the plurality of imaging cells adjacent the optical receiver cell is monitored to detect deviation of the optical signal beam from the optical receiver cell.

15. The apparatus of claim 1 wherein the first photosensitive crystalline semiconductor material is silicon and the second photosensitive crystalline semiconductor material is selected from the group consisting of germanium, germanium alloy, InGaAs and HgCdTe.

16. The apparatus of claim 1 wherein the second photosensitive crystalline semiconductor material is epitaxially grown on the first photosensitive crystalline semiconductor material.

17. The apparatus of claim 1 wherein the first photosensitive crystalline semiconductor material is crystalline silicon and the second photosensitive crystalline semiconductor material is epitaxially grown on the silicon.

18. The apparatus of claim 17 wherein the second photosensitive crystalline semiconductor material comprises germanium.

19. The apparatus of claim 1, wherein the plurality imaging cells comprises at least one hundred thousand imaging cells.

* * * * *

UNITED STATES PATENT AND TRADEMARK OFFICE
CERTIFICATE OF CORRECTION

PATENT NO. : 7,643,755 B2  Page 1 of 1
APPLICATION NO. : 10/964266
DATED : January 5, 2010
INVENTOR(S) : Conor S. Rafferty et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 544 days.

should read (*) Notice: Subject to any disclaimer, the term of this patent is extended or adjusted under 35 U.S.C. 154(b) by 1,069 days.

Claim 3, column 8, line 37, "imagine cells" should read --imaging cells--.

Claim 10, column 8, line 63, "tacking control circuit" should read --tracking control circuit--.

Claim 19, column 10, line 20, "plurality imaging" should read --plurality of imaging--.

Signed and Sealed this

Twenty-ninth Day of June, 2010

David J. Kappos
*Director of the United States Patent and Trademark Office*